United States Patent
Choi et al.

(10) Patent No.: US 6,859,656 B2
(45) Date of Patent: Feb. 22, 2005

(54) APPARATUS AND METHOD FOR OPTIMIZING TRANSMISSION POWER OF NETWORK

(75) Inventors: Joon-bo Choi, Sungnam (KR); Woo-shik Kang, Suwon (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 578 days.

(21) Appl. No.: 09/927,527

(22) Filed: Aug. 13, 2001

(65) Prior Publication Data

US 2002/0022495 A1 Feb. 21, 2002

(30) Foreign Application Priority Data

Aug. 12, 2000 (KR) ........................................ 2000-46810
Nov. 10, 2000 (KR) ........................................ 2000-66863
Mar. 3, 2001 (KR) ........................................ 2001-10982

(51) Int. Cl.[7] .............................................. H04B 7/00
(52) U.S. Cl. ...................... 455/522; 455/69; 455/172.1; 455/503; 455/517; 455/572
(58) Field of Search ....................... 455/522, 69, 127.1, 455/507, 517, 503, 572, 127

(56) References Cited

U.S. PATENT DOCUMENTS

| | | | | |
|---|---|---|---|---|
| 5,752,197 A | * | 5/1998 | Rautiola | ...................... 455/522 |
| 5,995,496 A | * | 11/1999 | Honkasalo et al. | ......... 370/318 |
| 6,483,816 B2 | * | 11/2002 | Tsunehara et al. | .......... 370/318 |
| 6,594,475 B1 | * | 7/2003 | Anvekar et al. | ......... 455/277.1 |
| 6,665,549 B1 | * | 12/2003 | Reed | ........................... 455/573 |

* cited by examiner

*Primary Examiner*—Nick Corsaro
*Assistant Examiner*—Shaima Q. Aminzay
(74) *Attorney, Agent, or Firm*—Sughrue Mion, PLLC

(57) ABSTRACT

An apparatus and a method for performing a protocol that optimizes a transmission power in a network. The apparatus and the method perform a protocol that optimizes the transmission power in the network for point-to-multipoint communication (1:N). The apparatus includes a communication unit for sending and receiving a data packet through the air, and a control unit that outputs a control signal for controlling the transmission power according to connection information of the data packet received through the communication unit. The connection information includes a reception signal strength and/or link quality information. Since the transmission power is adjustable, communication is carried out among nodes of the network with an adequately minimum power consumption and a proper communication quality.

8 Claims, 8 Drawing Sheets

APPARATUS AND METHOD FOR OPTIMIZING TRANSMISSION POWER OF NETWORK

BACKGROUND OF THE INVENTION

1. Field of the Invention

The present invention relates to an apparatus and a method for performing a protocol that optimizes a transmission power in a network, and more particularly to an apparatus and a method for performing a protocol that optimizes transmission power in a point-to-multipoint communication (1:N) network. The present application is based on Korean Patent Application Nos. 2000-46810, 2000-66863, and 2001-10982, which are incorporated herein by reference.

2. Description of the Related Art

A wireless communication technology uses a radio wave for data transmission. Wireless communication apparatuses, which constitute a wireless communication system, are well known for mobility, portability, and simplicity. Further, due to the fact that the wireless communication system can transmit data regardless of the location of a user, the wireless communication system is used in wider range of the field. One example of the wireless communication system is a wireless Local Area Network (LAN), which makes up for the shortcomings of a wired LAN through an advanced wireless communication technology. Since the wireless LAN can extend to an area that was almost impossible for the wired LAN to reach, the wireless LAN has advantages of flexibility and installability.

Meanwhile, the wireless communication system uses centralized packet transmission and a distributed packet transmission. The centralized transmission method can be used only through a relay of a central node for the communication between a terminal node and a central node, or between a node to another node. Meanwhile, according to the distributed transmission method that uses an omnidirectional nature of the wireless system, the communication is carried out directly between the node to another node without requiring a relay of a separate central node. The distributed transmission method is particularly efficient in a network that is constituted by mobile terminals such as a Personal Ad-hoc Network, since the mobility can be guaranteed.

The mobile terminal used in the wireless network is supplied with power from a battery. Since the battery has a limited life span, there have been many suggestions to transmit data between the node at a minimum power, by exchanging transmission power information between the nodes. One example can be found in U.S. Pat. No. 5,450,616 and another in U.S. Pat. No. 5,465,398 (WO 95/10142).

According to U.S. Pat. No. 5,450,616, entitled "Method and Apparatus for Power Control in a Wireless LAN," first, a sending node sends to a master a data packet containing transmission power information for an initial packet transmission in a wireless LAN. The master calculates a suggested value for the transmission power with the received power information and signal quality data. Then the master transmits the result of calculation to the slave. Accordingly, the sending node adjusts the packet transmission power according to such calculated suggestion value for the transmission power.

According to U.S. Pat. No. 5,465,398 (WO 98/10142), entitled "Automatic Power Level Control of a Packet Communication Link," a target node compares a Received Signal Strength Indicator (RSSI) of a received signal with a stored minimum strength, and notifies a source node of a quantitative difference. The source node adjusts the transmission power so as the moving average over time of the received quantitative difference to satisfy a predetermined threshold. That is, the power level of the source node is adjusted according to the comparison result of the RSSI of the received signal and the minimum strength.

According to U.S. Pat. Nos. 5,450,616 and 5,465,398, transmission power can be adequately adjusted in the point-to-point communication between two nodes. However, in case of point-to-multipoint communication, which is usually expected in the wireless LAN, the transmission power cannot be optimized by the approaches suggested by the above two patents. This is because it is difficult to keep the power for all the wireless apparatuses in the communication at a minimum just by increasing or decreasing the transmission power. In other words, the approaches of the above two patents suggest that the transmission power be optimized with reference to the least optimal transmission status.

An example of the point-to-multipoint communication method for the wireless LAN is the Bluetooth technology. The Bluetooth technology is one of the wireless communication methods that does not require centralized management, and enables data transmission among the Bluetooth embedded apparatuses within a short-range distance without being connected by a cable. While the Bluetooth can provide point-to-point or point-to-multipoint connection, owing to absence of central control structure, it is hard to apply the Bluetooth technology in the network. One or more units that share the same channel are connected in a Piconet. Accordingly, in the Piconet, one of the Bluetooth embedded apparatuses serves as a master, while the other apparatuses serve as slaves. In the network constructed as the above, the master has to ensure that the communication to the slaves is performed at an adequate minimum transmission power and a constant adequate communication quality.

SUMMARY OF THE INVENTION

An object of the present invention is to provide an apparatus and a method for performing a protocol that optimizes a transmission power so that communication is performed between nodes in point-to-multipoint communication (1:N) at an adequate communication quality and at an adequate minimum transmission power.

The above object is accomplished by an apparatus for optimizing a transmission power in a network according to the present invention, including a communication unit for sending and receiving a data packet through the air; a power measuring unit for measuring the power of the data packet received at the communication unit; and a control unit for requesting an adjustment of the transmission power to a slave that sends the data packet, based on a reception power of the data packet measured through the power measuring unit and a reception status parameter of the data packet.

The apparatus according to the present invention further includes a power adjusting unit for adjusting the transmission power of the communication unit; and a memory for storing transmission power data of the slave.

When the data packet is received through the communication unit requesting the adjustment of the transmission power, the control unit accordingly updates the transmission power value that is stored in the memory corresponding to the slave that requests the adjustment of the transmission power, and when the control unit transmits the data packet to the requesting slave, the control unit outputs a control signal to the power adjusting unit for transmission power adjustment according to the updated transmission power.

It is preferable that the control unit controls the power measuring unit to measure the reception power of the received data packet and a reception link quality, only when the control unit receives through the communication unit a message requesting a measurement of the transmission power.

The control unit broadcasts a message requesting the transmission power measurement in a predetermined periodic cycle, in order to receive the transmission power adjustment requesting message.

The above object is also accomplished by a method of an apparatus for optimizing a transmission power in a network, the apparatus including a communication unit for sending and receiving a data packet through the air; a power measuring unit for measuring the power of the data packet received at the communication unit; and a control unit for requesting an adjustment of the transmission power of a slave that sends the data packet, based on a reception power of the data packet measured through the power measuring unit and a reception status parameter of the data packet, the method in accordance with the first preferred embodiment of the present invention including the steps of (a) when a data packet is received through the communication unit, measuring a reception link quality of a slave through a reception power of the data packet measured from the power measuring unit and a reception status parameter of the data packet; and (b) sending the transmission power adjustment requesting message to the slave based on the reception link quality.

The reception link quality measuring step (a) measures the reception power of the received data packet and a reception link quality only when a message requesting a measurement of the transmission power is received.

The above object is also accomplished by a method of an apparatus for optimizing a transmission powering a network, the apparatus including a communication unit for sending and receiving a data packet through the air; a power adjusting unit for adjusting the transmission power of the communication unit, and a control unit for controlling a master according to contents of the data packet received through the communication unit to communicate with slaves, the method in accordance with the second preferred embodiment of the present invention including the steps of receiving through the communication unit a message requesting an adjustment of the transmission power; updating the transmission power stored in a memory for the requesting slave according to the message that requests the adjustment of the transmission power; and adjusting the transmission power through the power adjusting unit according to the updated transmission power obtained from the memory, and outputting a data packet to the requesting slave.

The method farther includes the step of periodically broadcasting the transmission power measurement requesting message in order to receive the transmission power adjustment requesting message.

The above object is also accomplished by a method for optimizing a transmission power in a network in accordance with the third preferred embodiment of the present invention, including the steps of (I) determining a reference transmission power between a master and a plurality of slaves by comparing linkage information received from one of the plurality of slaves with an acceptable quality; and (II) optimizing the transmission power between the master and the plurality of the slaves.

The linkage information is link quality information.

The step (I) includes the sub-steps of (a) checking a current transmission power; (b) initializing a slave counter variable N and recording a total number of the slaves; (c) receiving the link quality information from an Nth slave; (d) comparing the link quality information received from the substep (c) with the acceptable quality; (e) when the link quality information equals the acceptable quality in the sub-step (d), recording the current transmission power as a reference transmission power and proceeding to the transmission power optimizing step; (f) when the link quality information is below the acceptable quality in the sub-step (d), obtaining the reference transmission power by increasing the current transmission power; and (g) when the link quality information is above the acceptable quality in the substep (d), obtaining the reference transmission power by decreasing the current transmission power.

The sub-step (f) includes the sub-steps of (f-1) comparing the current transmission power with a maximum transmission power; (f-2) when the current transmission power is different from the maximum transmission power in the sub-step (f-1), increasing the current transmission power; (f-3) after the current transmission power is increased in the sub-step (f-2), re-receiving the link quality information from the Nth slave; (f-4) comparing the link quality information re-received in the sub-step (f-3) with the acceptable quality, and recording the increased transmission power as the reference transmission power and proceeding to the transmission power optimizing step (II) when the re-received link quality information equals, or is above the acceptable quality; (f-5) when the link quality information re-received in sub-step (f-4) is below the acceptable quality, comparing the increased transmission power with the maximum transmission power, and proceeding to the sub-step (f-2) if the increased transmission power is different from the maximum transmission power; and (f-6) when the increased transmission power equals the maximum transmission power in the sub-step (f-5), or when the current transmission power equals the maximum transmission power in the sub-step (f-1), indicating a failure of transmission power adaptation and ending the transmission power adaptation.

The above object is also accomplished by a method for optimizing a transmission power in a network in accordance with the fourth preferred embodiment of the present invention, including the steps of (i) selecting a slave for a transmission power determination according to linkage information received from a plurality of slaves of the network; and (ii) determining the transmission power based on a comparison between the linkage information received from the selected slave with an acceptable quality.

The step (i) includes the sub-steps of (i-1) receiving linkage information from the plurality of slaves of the network; (i-2) determining an order of the plurality of slaves according to a strength of the received linkage information; and (i-3) according to the order determined in the sub-step (i-2), determining a slave having the least strength of the linkage information as the slave for transmission power determination.

The sub-step (ii) includes the sub-steps of (ii-1) checking a current transmission power; (ii-2) comparing linkage information of the slave for the transmission power determination with the acceptable quality; (ii-3) recording the current transmission power as an adapted transmission power when the connection information equals the acceptable quality; (ii-4) obtaining the adapted transmission power by increasing the current transmission power, when the connection information is below the acceptable quality; and (ii-5) obtaining the adapted transmission power by decreasing the current transmission power, when the connection information is above the acceptable quality.

The above object is also accomplished by a method for optimizing a transmission power of a network where a master leaves in accordance with the fifth preferred embodiment of the present invention, including the steps of (A) generating backup master information based on linkage information received from a plurality of slaves constituting the network; (B) sensing a master leaving the network; (C) determining a backup master according to an order of the backup master generated by the step (A); (D) determining a reference transmission power between the backup master and the plurality of slaves; and (E) optimizing the transmission between the backup master and the slaves.

When the reference transmission power in the step (D) is a maximum transmission power, the step (E) obtains an adapted transmission power that satisfies the acceptable quality, by decreasing the reference transmission power.

When the reference transmission power in the step (D) is a minimum transmission power, the step (E) obtains an adapted transmission power that satisfies the acceptable quality, by increasing the reference transmission power.

Accordingly, the transmission power between the master and the slaves of the Bluetooth network can be optimized.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The preferred embodiments of the present invention will now be described with reference to the accompanying drawings, while the like elements are given the same reference numerals throughout and any redundant explanation is omitted as possible.

Figure 1:
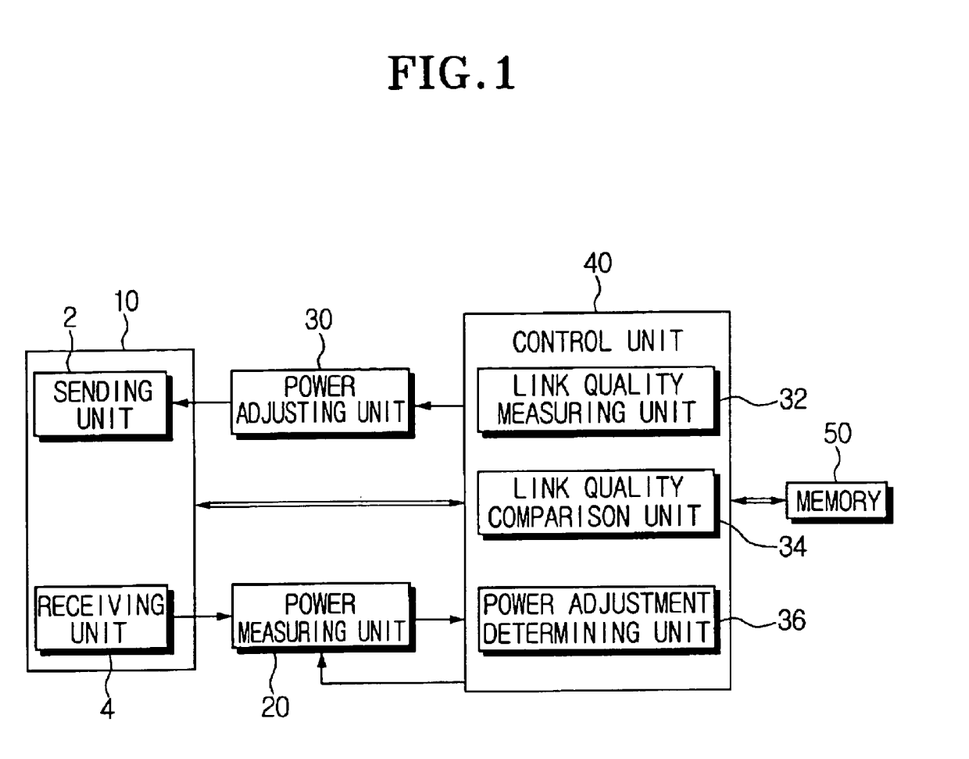
FIG. 1 is a block diagram showing an apparatus for optimizing a transmission power of a network in accordance with the present invention.

Referring to FIG. 1, an apparatus for optimizing a transmission power in a network according to the present invention includes a communication unit having a sending unit 2 and a receiving unit 4, a power measuring unit 20, a power adjusting unit 30, a control unit 40, and a memory 50.

The communication unit 10 sends or receives a data packet through the air.

The power measuring unit 20 measures the power of the data packet received through the receiving unit 4.

The power adjusting unit 30 adjusts the transmission power of the sending unit 2. The memory 50 stores the transmission power value of the respective slaves.

The control unit 40 includes a link quality measuring unit 32, a link quality comparing unit 34, and a power adjustment determining unit 36.

The link quality measuring unit 32 measures a quality of a link with a certain slave based on a reception power of the data packet measured by the power measuring unit 20 and a reception status parameter of the data packet. The reception status parameter of the data packet, which is used to measure the link quality of the slave, includes a data error rate, error correction rate, a bandwidth loss, and a delay. Also, such measured link quality in this embodiment is defined as a reception link quality.

The link quality comparing unit 34 compares the reception link quality with a predetermined reference link quality.

The power adjustment determining unit 36 determines whether to increase or decrease the transmission power of the slave according to the result obtained from the calculation of the link quality comparing unit 34.

The control unit 40 broadcasts a packet to the slaves through the sending unit 2, requesting the slaves to adjust the transmission power according to the power adjustment value determined by the power adjustment determining unit 36.

Further, exclusively when the message requesting the measurement of the transmission power is received through the receiving unit 4, the control unit 40 measures the reception power and reception link quality of the data packet received from the power measuring unit 20.

Meanwhile, upon receipt of the data packet from a certain slave through the communication unit 10 that requests the adjustment of the transmission power, according to the transmission power adjustment request, the control unit 40 updates the transmission power value that is stored in the memory 50 for the requesting slave. While sending the data packet, the control unit 40 outputs to the power adjusting unit 30 a transmission power adjustment control signal reflecting the updated transmission power value.

The power adjusting unit 30 outputs the data packet at the transmission power that is adjusted according to the transmission power adjustment control signal output from the control unit 40.

Further, the control unit 40 may broadcast the transmission power measurement requesting message at a certain cyclic period, so as to receive the transmission power adjustment requesting message.

The method for optimizing the transmission power in the network in accordance with the present invention will be described with reference to FIGS. 2 through 8.

Figure 2:
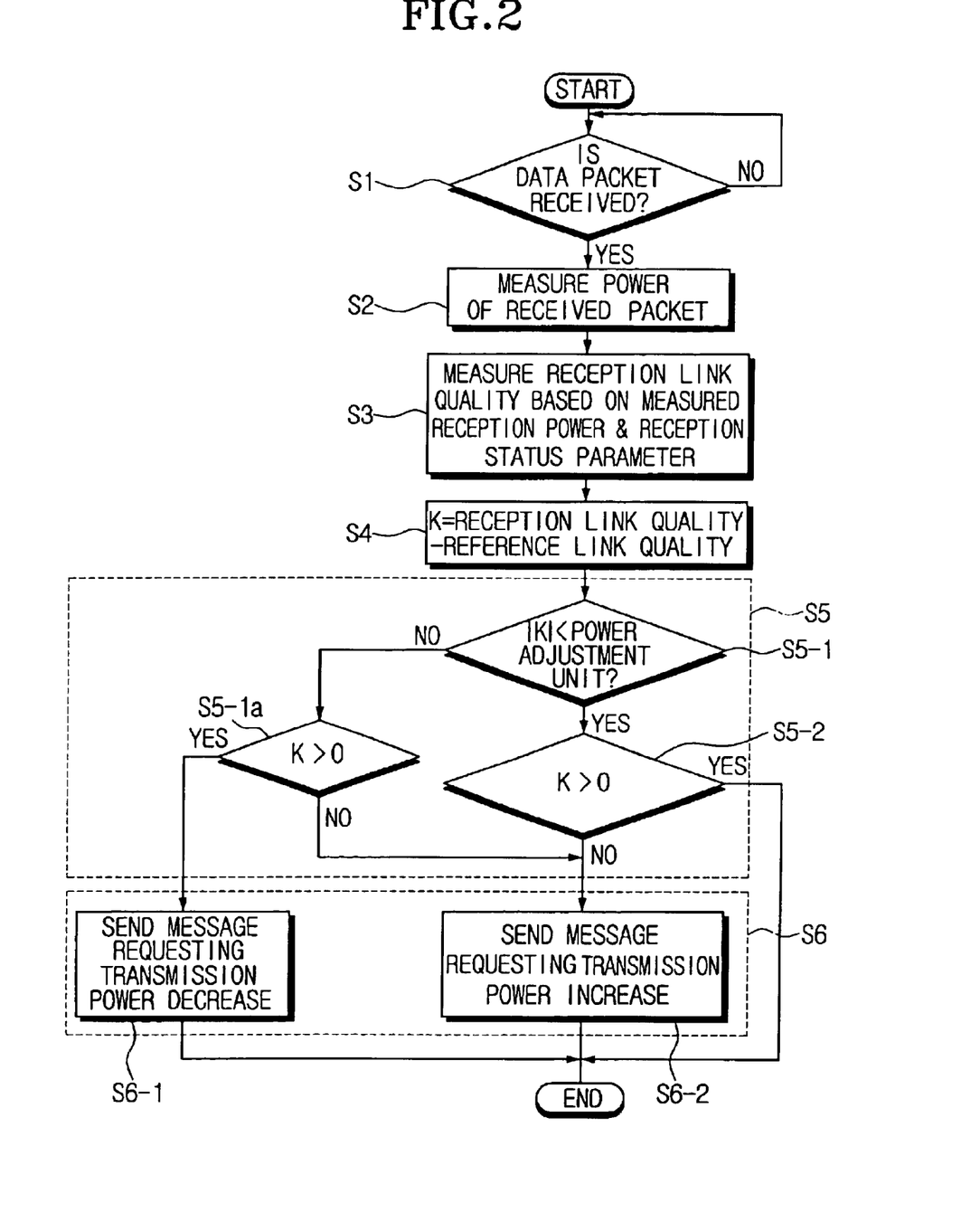
FIG. 2 is a flow chart of a method of a master device for optimizing the transmission power in the network in accordance with a first preferred embodiment of the present invention.

First, the method for optimizing the transmission power in the network in accordance with the first preferred embodiment of the present invention will be described with reference to FIG. 2.

First, a data packet is received through the receiving unit (step S1). The power measuring unit 20 measures the reception power of the received data packet (step S2).

The reception link quality measuring unit 32 measures the quality of the reception link of the slave based on the reception power of the data packet measured by the power measuring unit 20 and the reception status parameter of the data packet.

The link quality comparing unit 34 calculates a difference K between the reception link quality value and the reference link quality value (step S4).

With reference to the difference K obtained from the comparison step S4, it is determined whether to request the slave, the sender of the data packet, to increase or decrease the transmission power (step S5).

According to the result obtained by the transmission power increase/decrease determining step S5, the transmission power adjustment requesting message is transmitted to the slave (step S6).

The transmission power increase/decrease step S5 includes the following sub-steps.

First, it is determined whether an absolute value |K| of the link quality comparison result K is below a predetermined power adjustment unit (step S5-1).

If the absolute value |K| of the link quality comparison result K is below the predetermined power adjustment unit, it is determined whether the link quality comparison result K is above zero (0) (step S5-2). If yes, the current transmission power of the slave is maintained, and the transmission power optimizing process is ended.

Meanwhile, if the link quality comparison result K is below zero (0), the control unit 40 sends the transmission power increase requesting message to the slave (step S6-2).

Meanwhile, if the absolute value |K| of the link quality comparison result K is above the predetermined power adjustment unit in S5-1, it is determined whether the link quality comparison result K is above zero (0) (step S5-1a). If yes, the control unit 40 sends the transmission power decrease requesting message to the slave (step S6-1).

If the link quality comparison result K is below the zero (0) in S5-1a, the control unit 40 sends the transmission power increase requesting message to the slave (step S6-2).

Accordingly, if the absolute value |K| of the link quality comparison result K is equal to or greater than the predetermined power adjustment unit, and the link quality comparison result K is greater than the zero (0) in S5-1a, the transmission power decrease requesting message is forwarded to the slave until the absolute value |K| falls into the range of the predetermined power adjustment unit.

According to another aspect of the first embodiment, the reception power and the reception link quality are measured (S2 and S3) only upon receipt of the message that requests the measurement of the reception power.

Alternatively, the master may not perform the comparison step, but simply send the measurement result to the slave. Then the slave may perform the comparison step and adjust the power accordingly. Since one slave may calculate all the measurement values transmitted from the respective masters, it is more efficient in terms of load distribution than when the master performs the comparison step.

Figure 3:
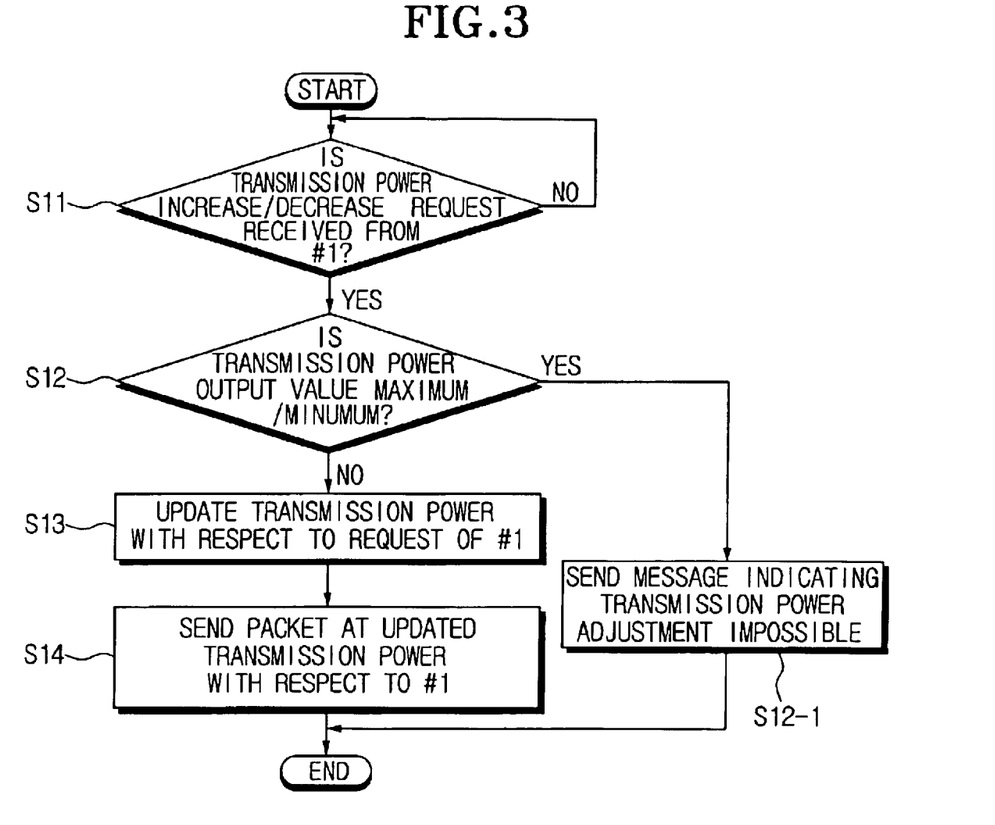
FIG. 3 is a flow chart of a method of a slave apparatus for optimizing the transmission power in the network in accordance with a second preferred embodiment of the present invention.

Referring to FIG. 3, the method of the slave for optimizing the transmission power in the network in accordance with the second preferred embodiment of the present invention will be described below.

When the transmission power adjustment request is received from a certain master #1, the slave checks whether the transmission power is set to maximum or minimum, and thus it is impossible to adjust the transmission power (step S12).

When it is determined that the transmission power adjustment is impossible in S12, the slave sends a transmission power adjustment impossible message to the transmission power adjustment requesting master #1 (step S12-1).

When it is determined that the transmission power adjustment is possible in S12, the slave updates the transmission power values previously stored in the memory 50 according to the request of the master #1 (step S13).

After S13 is completed, the slave sends the data packet at the updated transmission power (step S14).

Here, another step may be further included to broadcast the transmission power measurement requesting message at a predetermined periodic cycle for receiving the transmission power adjustment requesting message.

According to another aspect of the second embodiment, when it is impossible to adjust the transmission power respectively, the transmission power may be adjusted with reference to the slave that is linked at the maximum reception power, while keeping the link quality with other slaves from degrading. Further, when there are transmission power decrease requests from the non-reference slaves, the master #1 sends the transmission power adjustment impossible messages to the non-reference slaves.

Figure 4:
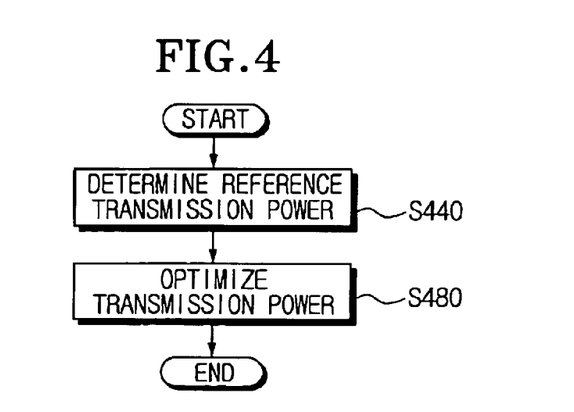
FIG. 4 is a flow chart for optimizing the transmission power in the network in accordance with a third preferred embodiment of the present invention.
Figure 5A:
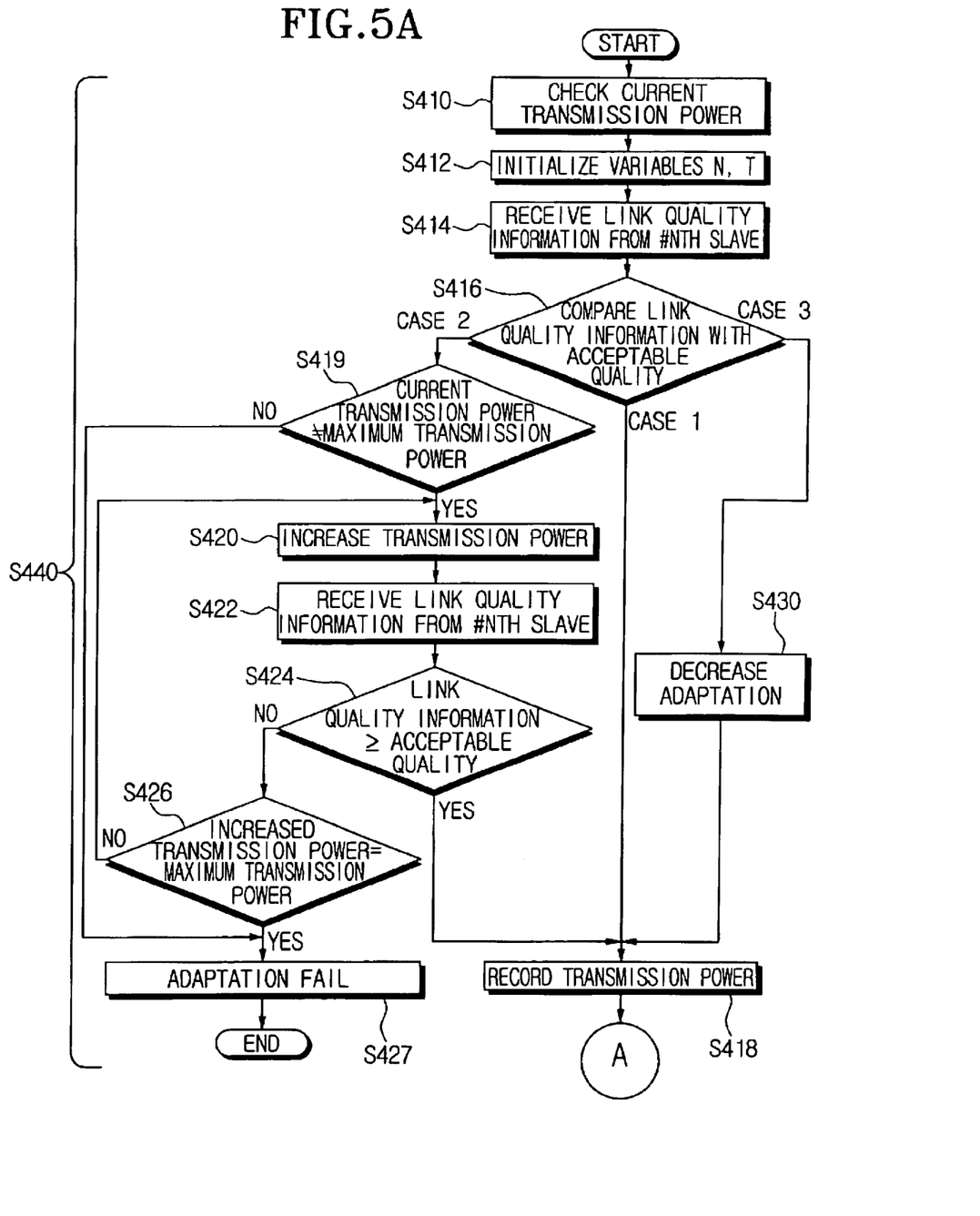
FIG. 5A is a flow chart of the sub-steps of a minimum transmission power determining step of FIG. 4.
Figure 5B:
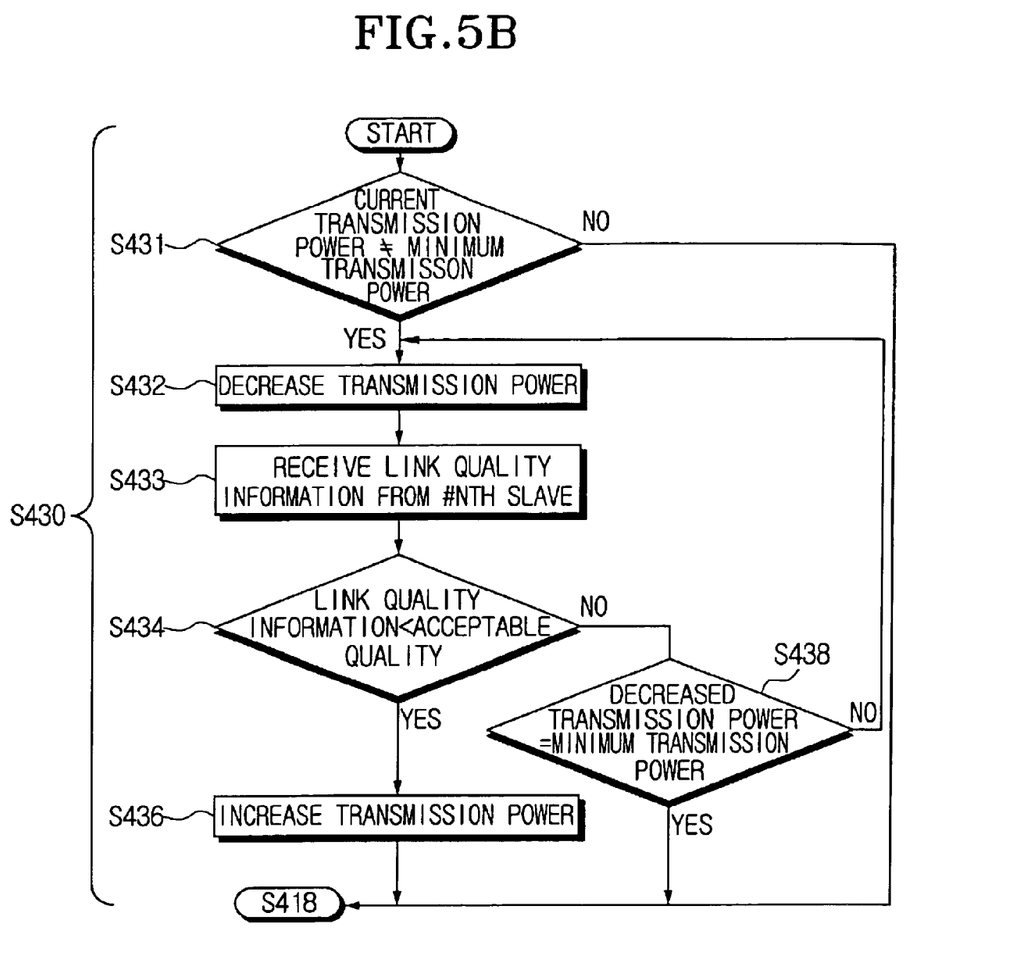
FIG. 5B is a flow chart of the sub-steps of a reduction adaptation step of FIG. 4.
Figure 6:
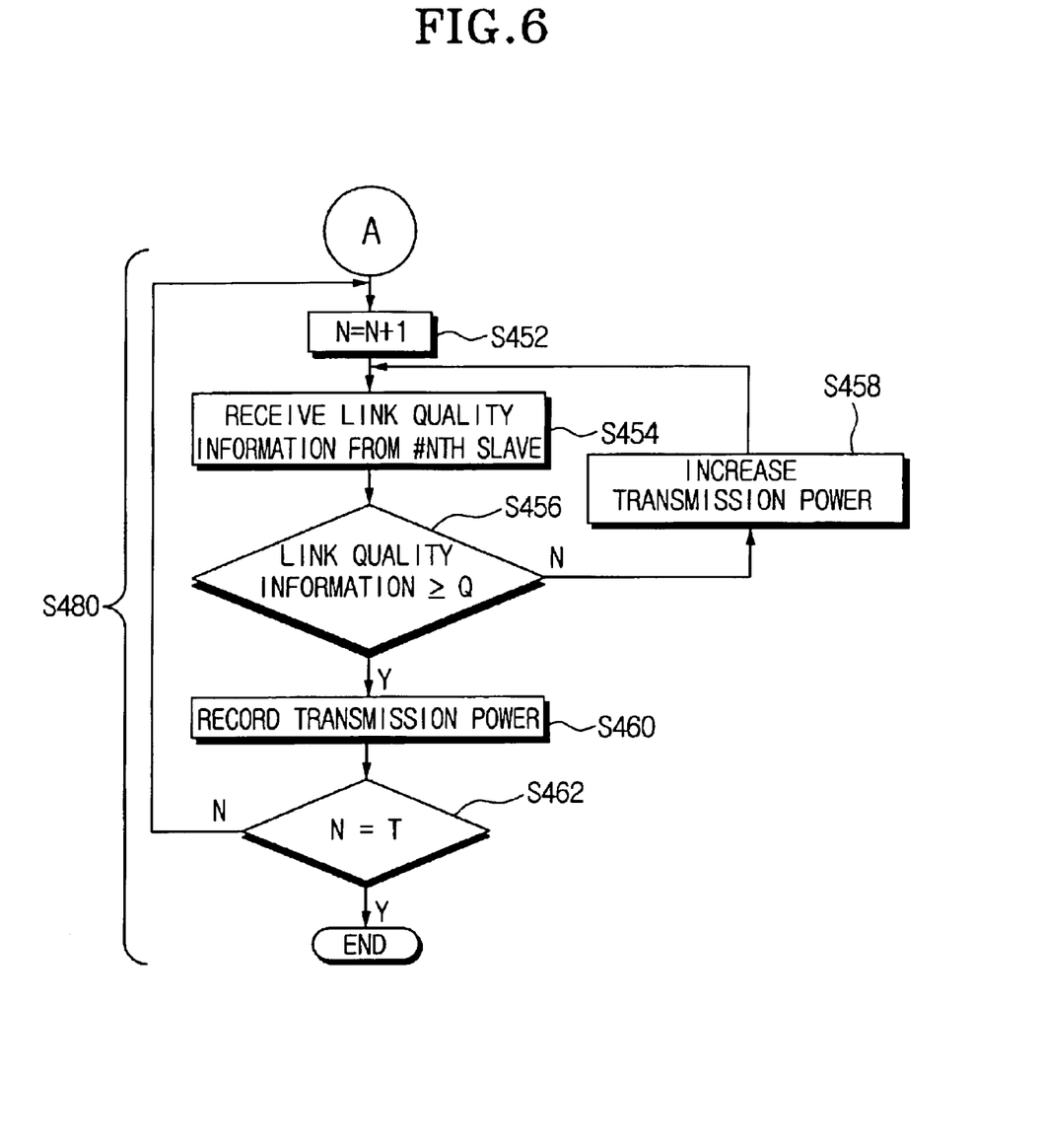
FIG. 6 is a flow chart of the sub-steps of the transmission power optimizing step of FIG. 4.

Referring to FIGS. 4 through 6, the method for optimizing the transmission power between the master and the slaves in the network in accordance with the third preferred embodiment of the present invention will be described below.

The method for optimizing the transmission power between the master and the slaves in the network in accordance with the third preferred embodiment of the present invention includes a reference transmission power determining step (step S440) and a transmission power optimizing step (step S480).

The reference transmission power determining step S440 determines a reference transmission power between the master and the slaves, by comparing linkage information received from one slave with an acceptable quality Q. The linkage information includes link quality information Link_Quality, direction, distance, or the like between the master and the slaves, and in this embodiment, the link quality information will be used as an example of the linkage information.

The transmission power optimizing step S480 optimizes the transmission power between the master and the slaves in the network.

A network manager of the master performs the reference transmission power determining step S440 according to a command language HCI, 'Adapt_Transmit_Power'.

In S440, the network manager checks the current transmission power of the master by using the HCI command language, 'Read_Transmit_Power' provided in the Bluetooth Specification (step S410).

Next, a slave counter variable N is initialized, and a variable initialization is performed, by recording the total number (T) of the slaves of the current network (step S412). In the description of the third embodiment of the present invention, let us say the initial value of the slave counter variable N is '1', and the total number T of the slaves is 5.

After step S412 is completed, the network manager performs a first link quality information receiving step (S414), by receiving the link quality information (Link_Quality) from the first slave.

Next, the first comparison (S416) is performed, i.e., the link quality information (Link_Quality) received in the first link quality information receiving step (S414) is compared with the acceptable quality Q. The acceptable quality Q is predetermined during a construction of the Piconet.

There are three cases of the first comparison step S416 according to the result from the comparison between the received link quality information (Link_Quality) and the acceptable quality Q as follows:

<Case 1>

When the link quality information (Link_Quality) received from the first slave equals the acceptable quality Q in S416, a first transmission power recording step (S418) is performed, i.e., the current transmission power as checked is recorded as the reference transmission power (RP), and the process is moved on to a transmission power optimizing step (S480).

<Case 2>

When the link quality information (Link_Quality) received from the first slave is below the acceptable quality Q in S416, the master performs an increase adaptation step, in which the master obtains a reference transmission power (RP) by increasing the transmission power to the first slave by a predetermined amount.

In the increase adaptation step, the master performs a maximum transmission power comparison step (S419), in which the master compares the current transmission power (PP) with a maximum transmission power (MP).

When the current transmission power PP equals the maximum transmission power MP in S419, it is indicated that the transmission power adaptation fails, and the process is ended (step S427).

Meanwhile, if the current transmission power PP is different from the maximum transmission power MP in S419, a first transmission power increase step (S420) is performed, i.e., the current transmission power PP is increased by a predetermined step.

When the first transmission power increase step (S420) is completed, the master performs a first link quality information re-receiving step (S422), by re-receiving the link quality information (Link_Quality) from the first slave.

Next, in a second comparison step (S424), the link quality information (Link_Quality) re-received from the first slave in the first link quality information re-reception step (S422) is compared with the acceptable quality Q.

If the link quality information (Link_Quality) re-received in the second comparison step (S424) is below the acceptable quality Q, a transmission power upper limit checking step (S426) is performed, i.e., the increased transmission power (IP) is compared with the maximum transmission power MP.

If the current transmission power PP is different from the maximum transmission power MP in S426, the first transmission power increase step (S420) is performed.

However, if the current transmission power PP equals the maximum transmission power MP in S426, the adaptation failure indicating step (S427) is performed.

<Case 3>

When the link quality information (Link_Quality) received from the first slave is above the acceptable quality Q in S416, the master performs a decrease adaptation step (S430), in which the master obtains the reference transmission power (RP) by decreasing the current transmission power PP.

The decrease adaptation step (S430) includes a minimum transmission power determining step (S431), a transmission power decreasing step (S432), a second link quality information re-receiving step (S433), a third comparison step (S434), a second transmission power increasing step (S436), and a fourth comparison step (S438), as shown in FIG. 5B.

The minimum transmission power determining step (S431) compares the current transmission power PP with a minimum transmission power MinP. If the current transmission power PP equals the minimum transmission power MinP, the process is moved onto the first transmission power recording step (S418).

If the current transmission power PP is different from the minimum transmission power MinP in S431, the power decreasing step (S432) is performed, decreasing the transmission power of the Nth slave.

After the transmission power decreasing step S432, a second link quality information re-receiving step (S433) is performed, in which the link quality information (Link_Quality) is re-received from the Nth slave.

After the second link quality information re-receiving step (S433), a third comparison step (S434) is performed, as the link quality information (Link_Quality) received from the Nth slave is compared with the acceptable quality Q.

When the re-received link quality information (Link_Quality) of the third comparison step (S434) is below the acceptable quality Q, a second transmission power increase step (S436) is performed, increasing the decreased transmission power PP, and moving on to the transmission power optimizing step (S480).

When the re-received link quality information (Link_Quality) of the third comparison step (S434) is not below the acceptable quality Q, the fourth comparison step (S438) is performed. In the fourth comparison step (S438), the current transmission power PP is compared with the minimum transmission power MinP, and if the current transmission power PP equals to the minimum transmission power MinP, the reference transmission power recording step (S418) is performed, while if the current transmission power PP is not identical to the minimum transmission power MinP, the transmission power decreasing step (S432) is performed.

The transmission power optimizing step (S480) includes a variable increasing step (S452), a second link quality information receiving step (S454), a fifth comparison step (S456), a third transmission power increasing step (S458), a second transmission recording step (S460), and a transmission power optimizing step (S462), as shown in FIG. 6.

More specifically, after the reference transmission power is determined, a slave counter variable N is increased to optimize the transmission power of the slaves (step S452).

Next, the master performs the second link quality information receiving step (S454), receiving the link quality information (Link_Quality) from the Nth slave.

Then the fifth comparison step (S456) is performed, comparing the link quality information (Link_Quality) received from the Nth slave in the second link quality information receiving step (S454) with respect to the acceptable quality Q.

If the link quality information (Link_Quality) received from the Nth slave is below the acceptable quality Q in the fifth comparison step (S456), the master performs the third transmission power increasing step (S458), by increasing the transmission power of the Nth slave by a predetermined unit, and performing the second link quality information receiving step (S454).

Meanwhile, if the link quality information (Link_Quality) of the Nth slave is equal to or greater than the acceptable quality Q in the fifth comparison step (S456), the reference power recording step (S460) is performed, by recording adapted transmission power AP as the reference transmission power RP (step S460).

Next, the transmission power optimization confirming step (S462) is performed, i.e., it is checked whether the adapted transmission power AP is optimized for all the slaves or not.

In the transmission power optimization confirming step (S462), the slave counter variable N is compared with the total number T of the slaves. If the total number T of the slaves is different from the slave counter variable N, the variable increasing step (S452) is performed, while if the total number T of the slaves equals to the slave counter variable N, the transmission power optimizing step (S480) is ended.

The transmission power recording step (S460) is executed by the HCI command language, "Write_Transmit_Power".

Figure 7:
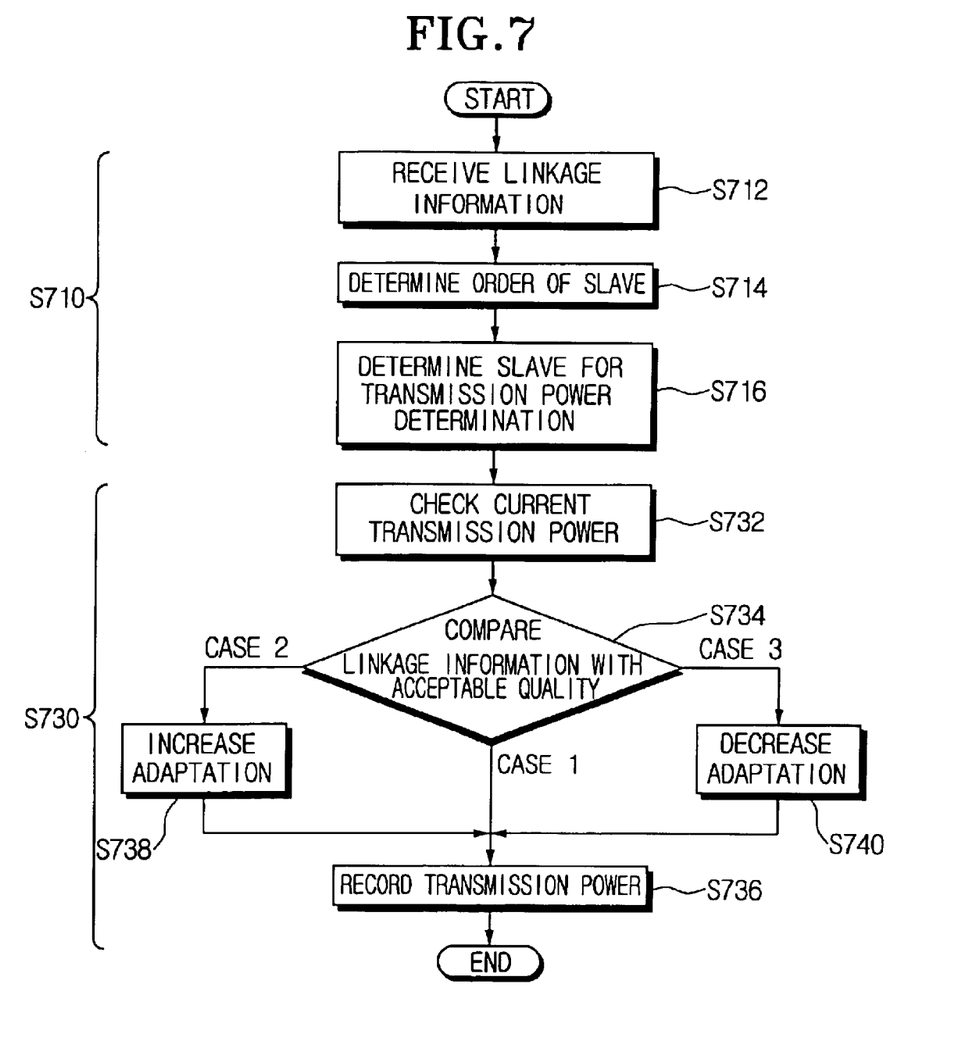
FIG. 7 is a flow chart of a method for optimizing the transmission power in the network in accordance with a fourth preferred embodiment of the present invention.

Referring to FIG. 7, the method for optimizing the transmission power in the network in accordance with the fourth preferred embodiment of the present invention will be described.

The method for optimizing the transmission power in the network in accordance with the fourth preferred embodiment of the present invention includes a slave selecting step (S710) and a transmission power determining step (S730).

The slave selecting step (S710) selects a slave for transmission power determination, based on the linkage information received from a plurality of slaves that constitute the network.

The slave selecting step (S710) includes the following sub-steps:

First, a linkage information receiving step (S712) is performed, i.e., the linkage information is received from the respective slaves of the network.

Next, the slave order determining step (S714) is performed, i.e., the order of the slaves is determined in accordance with the strength of the linkage information received in the linkage information receiving step (S712).

According to the order of the slaves determined in S714, the slave having the least strength is determined as the slave for transmission power determination (step S716).

The transmission power determining step (S730) determines the transmission power, based on the comparison between the linkage information received from the slave selected in the slave selecting step S710 and the acceptable quality Q.

The transmission power determining step (S730) includes the following sub-steps:

First, the current transmission power is checked (step S732).

Next, the linkage information of the slave selected in the slave determining step (S716) is compared with the acceptable quality Q (step S734).

In case 1 when the linkage information of the selected slave equals the acceptable quality Q in the comparison step (S734), the current transmission power is recorded as the adapted transmission power (step S736).

In case 2 when the linkage information of the selected slave is below the acceptable quality Q in the comparison step (S734), the increase adapting step (S738) is performed, i.e., the adapted transmission power is obtained by increasing the current transmission power.

In case 3 when the linkage information of the selected slave is greater than the acceptable quality Q in the comparison step (S734), the decrease adapting step (S740) is performed, i.e., the adapted transmission power is obtained by decreasing the current transmission power.

According to the fourth preferred embodiment of the present invention, the transmission power is optimized to the slave that has the least strength of the linkage information. Accordingly, the fourth embodiment would not require a process such as the reference transmission power determining step of the third embodiment.

Figure 8:
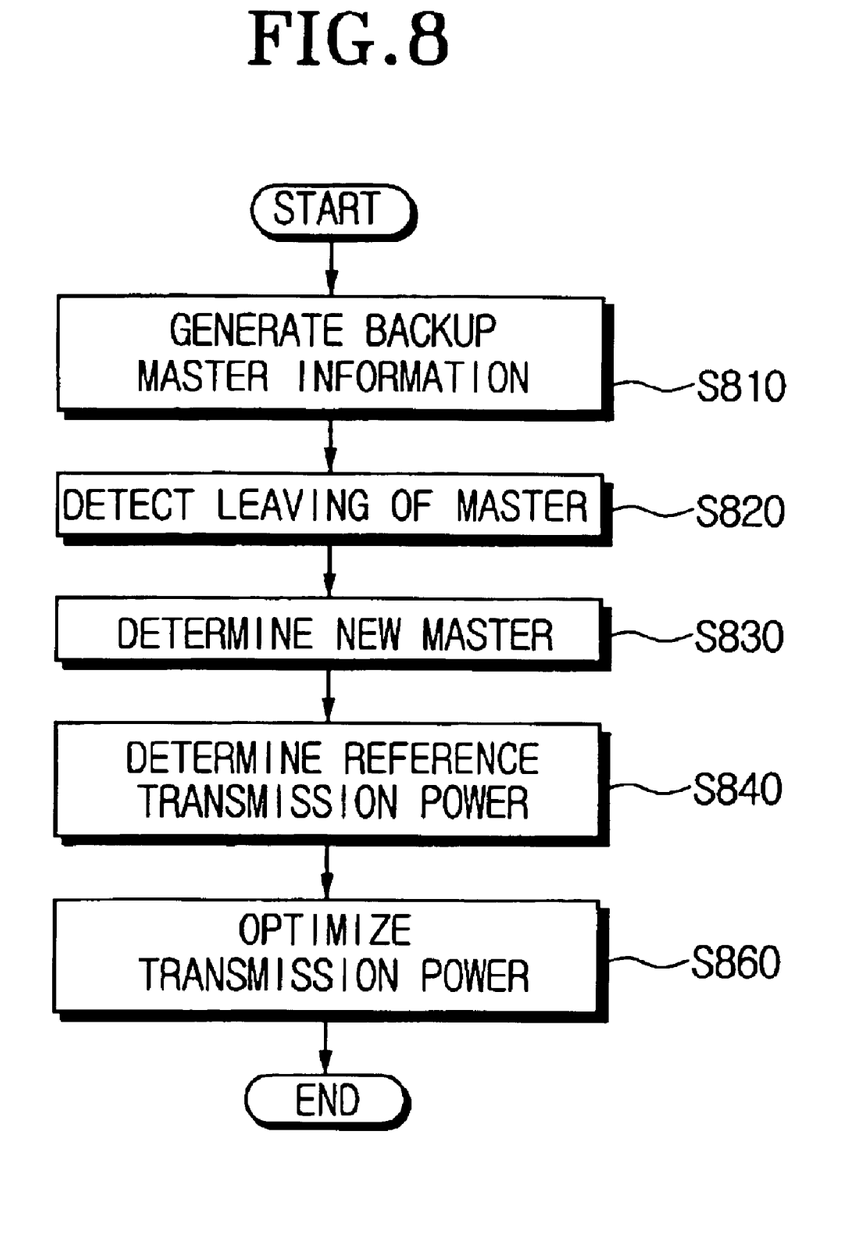
FIG. 8 is a flow chart of a method for optimizing the transmission power in the network in accordance with a fifth preferred embodiment of the present invention.

The method for optimizing the transmission power in the network in accordance with the fifth preferred embodiment of the present invention, in case of master leaving, will be described with reference to FIG. 8.

During a normal operation, the master periodically sets the order of the slaves for a backup master, thus permitting the slaves to construct a new network when the current master leaves the network.

The transmission power optimizing method in case of master leaving includes a backup master information generating step (S810), a master leaving sensing step (S820), a backup master determining step (S830), a reference transmission power determining step (S840), and a transmission power optimizing step (S860).

The backup master information generating step (S810) generates backup master information, based on the linkage information received from the slaves of the network. While generating the backup master information, the master also receives the linkage information from the slaves, in order to confirm whether all the slaves of the network are within a radio transmission range.

The linkage information may be a Received Signal Strength Indication (RSSI) and/or link quality information (Link_Quality). The RSSI is detected from the slaves and notified to the master. The RSSI is in close relation with the distance from the master. Based on the link quality information (Link_Quality), a data error rate between the master and the slaves can be obtained. Accordingly, the link quality information (Link_Quality) depends on certain factors such as distance between the master and the slaves, presence of obstacle between the master and the slave, or the like. The slave may know the strength of the received signal from the master by using the HCI command, "Read-RSSI", defined by the Bluetooth Specification. Also, by using the HCI command, "Get_Link_Quality", the slave may obtain the link quality information (Link_Quality) represented by one-byte digits. The higher the strength of the received signal and the link quality information (Link_Quality), the better the condition.

Based on an order of the highest signal strength and/or link quality, the master determines the order of the slaves for backup master. Accordingly, in case the master leaves the network, there is a higher possibility that the slave closest to the master may become the new master, and re-construct a network with other slaves.

The master broadcasts the slaves about the order of the slaves for backup master through a broadcasting channel. The master periodically updates the backup master order, considering the fact that the slaves may change their locations.

In case the master leaves the network due to several causes, such as power exhaust, intended manipulation by a user, etc., according to the backup master order, the network is re-constructed for the new master.

After the generation of the backup master information, the master leaving sensing step (S820) is performed, sensing if the master leaves the network. The leaving of the master is first sensed by the disconnection between the master and the slaves. According to the Bluetooth Specification Version 1.0, the Bluetooth-embedded apparatuses set the link supervision timer for checking the connection status therebetween in a predetermined periodic cycle (e.g. 0.625 ms–40.9 sec). When detecting the disconnection, the Bluetooth-embedded apparatuses report to the host about the Disconnection_Complete Event.

The periodic cycle for checking the connection status between the master and the slaves may be determined according to the link supervision timer. In the periodic cycle such determined, the slave checks the connection status with the master periodically.

When it is confirmed that the master left the network, the backup master determining step (S830) is performed.

The slaves suppose the first backup master as a new master, and establish the connection with the new master and construct a new network.

The new master establishes the connection with the slaves of the network, and confirms whether all the slaves are connected. If there is any slave that is not connected with the new master, the master broadcasts the information of the unconnected slave to the connected slaves.

If the first backup master leaves the network, too, according to the determined order, the next slave becomes a new master of the network.

When the new master is determined, the new master and the slaves determine the reference transmission power therebetween (step S840). In step S840, the reference transmission power may either be the maximum transmission power or the minimum transmission power. When the reference transmission power is the maximum transmission power in step S840, the transmission power may be optimized by the process similar to the decrease adaptation step of the third preferred embodiment, i.e., the optimal transmission power may be obtained by decreasing the current transmission power to an extent that satisfies the acceptable quality Q.

Meanwhile, if the reference transmission power is the minimum transmission power, the transmission power may be optimized by the process similar to the increase adaptation step of the third preferred embodiment, i.e., the optimal transmission power may be obtained by increasing the current transmission power to an extent that satisfies the acceptable quality Q.

The transmission power recording step records the current transmission power in a predetermined recording location of the Bluetooth module, and uses the recorded current transmission power as a reference of transmission power increase or decrease until the end of the transmission power optimizing step.

As described above, according to the present invention, the transmission power between the master and the slaves in the network can be optimized. Further, if the master leaves the network, one of the backup masters is set as a new master that constructs a new network. Also, the transmission power between the new master and the slaves is optimized. Accordingly, by adjusting the transmission power of the network, the transmission power consumption can be reduced while maintaining a proper communication quality.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A method for controlling a transmission power of a data transmitting device in a wireless network, the method comprising:

transmitting a packet comprising a transmission power measurement requesting message to a receiving device;

receiving a response packet comprising a transmission power adjustment requesting message responsive to the transmission power measurement requesting message to control the transmission power of the data transmitting device, wherein;

the transmission power adjustment requesting message comprises link information that is based on a link quality of the data transmitting device and a reference link quality of the receiving device, and the link quality of the data transmitting device includes reception power of the packet; and controlling the transmission power of the data transmitting device based on the transmission power adjustment requesting message.

2. The method according to claim 1, wherein the link quality of the data transmitting device further includes a reception status parameter of the packet.

3. The method according to claim 2, wherein at least one of a data error rate, an error correction rate, a bandwidth loss, and a delay is used as the reception status parameter.

4. The method according claim 1, wherein the reference link quality includes desired reference power of the receiving device.

5. The method according to claim 1, wherein the wireless network is a wireless local area network (WLAN).

6. The method according to claim 1, wherein the transmission power adjustment requesting message requests increase or decrease of the transmission power.

7. The method according to claim 1, wherein the packet comprising the transmission power measurement requesting message is transmitted according to a predetermined cyclic period.

8. A method for controlling a transmission power of a data transmitting device in a wireless network, the method comprising:

transmitting a packet comprising a transmission power measurement requesting message to a receiving device;

receiving a response packet comprising a transmission power adjustment requesting message responsive to the transmission power measurement requesting message to control the transmission power of the data transmitting device, wherein the transmission power adjustment requesting message comprises link information that is based on reception power of the packet and desired reference power of the receiving device; and controlling the transmission power of the data transmitting device based on the transmission power adjustment requesting message.

* * * * *